United States Patent [19]

Maruyama

[11] Patent Number: 4,828,360
[45] Date of Patent: May 9, 1989

[54] DRIVE MOTOR FOR CAMERA LENS ASSEMBLY

[75] Inventor: Shigehisa Maruyama, Tokyo, Japan
[73] Assignee: Sony Corporation, Tokyo, Japan
[21] Appl. No.: 76,723
[22] Filed: Jul. 23, 1987
[30] Foreign Application Priority Data Aug. 2, 1986 [JP] Japan .................. 61-118983[U]

[51] Int. Cl.⁴ ............................................ G02B 7/02
[52] U.S. Cl. ............................... 350/255; 350/429; 354/400
[58] Field of Search .............. 350/255, 429, 430, 247, 350/257; 354/400, 402, 403, 409, 195.1, 195.11, 295

[56] References Cited

U.S. PATENT DOCUMENTS 4,605,286  8/1986  Sumi ................................ 350/429
4,682,854  7/1987  Hanamori et al. ................. 350/255

FOREIGN PATENT DOCUMENTS 60-151606  8/1985  Japan .

Primary Examiner—John K. Corbin
Assistant Examiner—Loha Ben
Attorney, Agent, or Firm—Ronald P. Kananen

[57] ABSTRACT

The coils of the stepping motor are disposed on the outer periphery of stepped section of a stationary tube section of the lens assembly in a manner to define a stator yoke. The inner surface of the stepped section is provided with a helicoid gear which cooperates with a corresponding gear formed on the outer periphery of the rotatable front tube section of the lens assembly. The rotor magnet is secured on the inner periphery of a rearwardly extending flange-like section which encloses the stator yoke.

9 Claims, 1 Drawing Sheet

DRIVE MOTOR FOR CAMERA LENS ASSEMBLY

BACKGROUND OF THE INVENTION

1. Field of the Invention

The present invention relates to a camera lens assembly and more specifically to a camera lens assembly which includes a drive motor arrangement therein.

2. Description of the Background Art

In order to facilitate a better understanding of the invention, a typical construction of a camera lens assembly and a lens drive mechanism in the prior art will be discussed herebelow with reference to FIG. 1.

FIG. 1 is a sectional elevation showing the camera assembly and lens drive mechanism in the conventional art.

FIG. 1 shows a camera lens assembly for use in video cameras and the like which are equipped with an autofocus system and which includes a PM type stepping motor. This system was disclosed in Japanese Patent First (unexamined) Publication (Tokkai) Showa No. 60-151606, published on Aug. 9, 1985, for example. As shown, this arrangement includes a movable front lens tube section 1, a fixed lens tube section 2 and an inner rotor type lens drive PM stepping motor 3 which is defined therebetween. Viz., in this arrangement the front lens tube section 1 includes inner and outer coaxially arranged, axially extending and concentrically arranged cylindrical portions 1a and 1b. The outer cylindrical portion 1a is provided to permit manual focussing (manipulation) of the lens assembly 8 while the inner portion 1b is provided with a rotor magnet 4 on its outer periphery. The rotor magnet 4 and the inner section 1b form the rotor of the stepping motor 3. The fixed lens tube section 2 also includes inner and outer coaxially extending and concentrically arranged portions 2a and 2b. The inner portions 1b and 2b are operatively interconnected by a helicoid gear 5 formed therebetween. The outer section 2b of the fixed lens tube section 2 supports two axially arranged coils 6, 6 which define part of a plural pole yoke member 7 of the stepping motor 3. When the stepping motor 3 is energized, rotation of the rotor (1b,4) induces the focussing lens 8 to move along its focal axis.

However, this arrangement has suffered from the drawbacks that it is necessary to provide a clearance between the rotor and the yoke 7 and between the inner periphery of outer portion 1a and the outer periphery of portion 1b to permit the required mutual rotation therebetween. This, in combination with the provision of the rotor magnet 4 on the outer periphery of the inner portion 1b causes an increase in the diameter of the yoke 7 which in turn increases the diameter of the unit as a whole. Further, due to the provision of the helicoid gear 5 between the inner periphery of the inner portion 1b and the outer periphery of the inner portion 2b, the length of the movable first section 1 of the lens tube is undesirably increased.

In addition to these problems, the provision of the rotor magnet 4 in the illustrated position causes the diameter to be smaller than stator yoke 7 and therefore reduces the maximum amount of torque which can be applied to rotate the front lens tube section 1 and thus move the lens 8. Moreover, the rotor magnet 4 is made of a rubber magnetic material, and due to the elastomeric nature of this material, it is difficult to ensure that this element is precisely secured in place. This tends to degrade production efficiency.

SUMMARY OF THE INVENTION

It is an object of the present invention to provide a lens drive motor arrangement which enables the assembled unit to be reduced in diameter and length as compared with the above described prior art, which exhibits improved torque generation characteristics and which is easy to manufacture.

In brief, the above object is achieved by a lens/motor arrangement wherein the coils of the stepping motor are disposed on the outer periphery of a stepped section of a stationary tube section of the lens assembly in a manner to define a stator yoke. The inner surface of the stepped section is provided with a helicoid gear which cooperates with a corresponding gear formed on the outer periphery of the rotatable front tube section of the lens assembly. The rotor magnet is secured on the inner periphery of a rearwardly extending flange-like section which encloses the stator yoke.

More specifically, the present invention takes the form of a lens drive mechanism comprising: a cylindrical support, the cylindrical support having stator windings disposed on an outer peripheral surface thereof; a lens holder, the lens holder being operatively connected with the cylindrical support so as rotatable with respect thereto; a ring shaped rotor magnet, the ring shaped magnet being disposed on the lens holder in a manner to juxtapose the outer surface of the stator windings.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DETAILED DESCRIPTION OF THE PREFERRED EMODIDMENT

Figure 1:
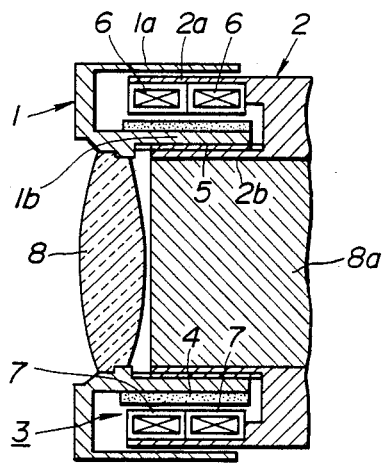
FIG. 1 is a sectional elevation showing the prior art arrangement discussed in the opening paragraphs of the instant disclosure.
Figure 2:
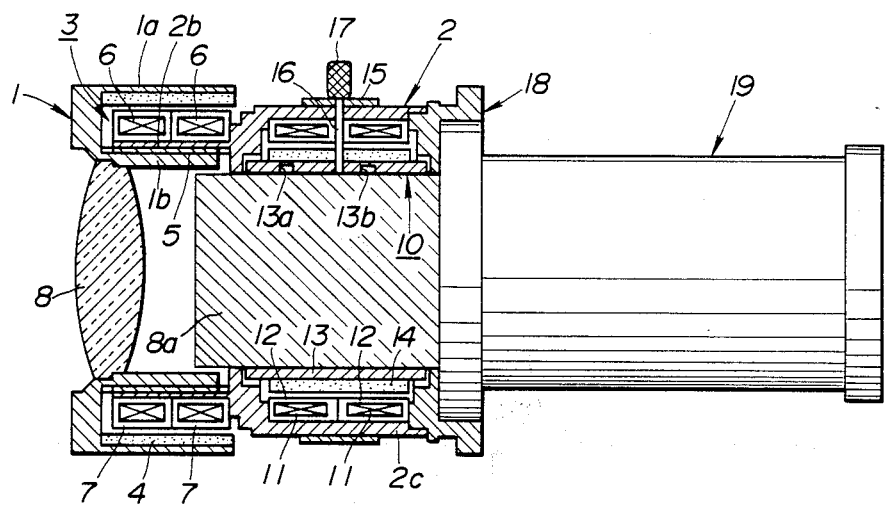
FIG. 2 is a sectional elevation of a embodiment of the present invention.

Referring now to FIG. 2, there is shown an embodiment of camera lens assembly and a lens drive mechanism therefor, according to the present invention. Similarly to the conventional art set forth above, this arrangement includes the movable front tube section 1 coaxially arranged in the fixed rear tube section 2. In this arrangement, the fixed rear tube section 2 is provided with only one cylindrical extension or portion 2b. This portion defines the stator yoke section of the autofocus PM stepping motor 3 and is arranged to carry the plural pole yoke arrangement 7 which includes the axially arranged coils 6, 6 on its outer periphery. The inner periphery of section 2b is formed with a helicoid gear 5 which cooperates with a corresponding gear formed on the outer periphery of the inner axially extending portion 1b of the front tube section 1 in which lens 8 is mounted. The rotor magnet 4 is disposed on the inner periphery of the outer axially extending portion 1a so as to juxtapose the outer periphery of the plural pole yoke 7. As will be appreciated, only one clearance is necessary. Viz., the clearance between the inner periphery of the rotor magnet 4 and the outer periphery of the yoke 7. This permits the diameter of the front section to be reduced as compared with the prior art of FIG. 1. Further with this arrangement it is possible to form the helicoid gear on the outer surface of portion 1b in a manner that it terminates close to the front end of the first section 1 thus permitting a reduction in the length thereof. Moreover, the disposition of the stator magnet 4 in the illustrated position (viz., an outer rotor type disposition) increases the diameter thereof and enables the generation of an increased amount of torque and further facilitates easy assembly of the unit during assembly.

The illustrated embodiment further includes a zoom lens drive assembly. This assembly includes an inner rotor type PM stepping motor 10. This motor includes two axially arranged coils 11, 11 which form part of a plural pole yoke 12 which in combination with the section of the section 2 on which it is disposed defines the stator of the motor 10. The numeral 13 denotes a rotor yoke which is rotatably mounted in the illustrated position by non-illustrated means. This rotor yoke 13 has a rotor magnet 14 secured thereto. The magnet in this embodiment is also made of the same rubber magnetic material as rotor magnet 4 of the autofocus motor 3. Elements 13 and 14 define the rotor of the stepping motor 10.

The above mentioned rotor yoke 13 includes integral cams 13a and 13b. These elements cooperate with cam followers which are operatively connected with variator and compensator lenses (not shown). A rotatably mounted zoom link 15 is connected via pin 16 with the rotor yoke 13. A knob 17 is provided on the outboard end of the pin 16 to permit manual macro switching.

An iris mechanism (not shown) is disposed in the base of the second section 2. The second section is mounted on a master tube 19 section in which a master lens assembly (not shown) is disposed.

As will be appreciated herefrom, the present invention provides a lens drive motor arrangement which enables the assembled unit to be reduced in diameter and length as compared with the above described prior art by arranging the stator yoke on the outer periphery of the front end tube section and disposing the rotor magnet on the lens holder in a manner to juxtapose the outer surface of the stator winding. Furthermore, the camera lens assembly and the lens drive mechanism according to to the invention, exhibits improved torque generation characteristics by providing a larger diameter for the rotor magnet. In addition, as seen from the discussion above, since the rotor magnet can be housed within a focusing ring which is constituted by the cylindrical portion 1a of the movable front lens tube section, in such a manner that the front end of the helicoid gear overlaps with the inner cylinderical portion 1b of the movable front lens tube section, the axial length of the movable front lens tube section can be substantially reduced.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims. For example, though the present invention has been disclosed in terms of the preferred embodiment of the invention, which has been directed to a video camera, it would be applicable for a still camera and so forth.

What is claimed is:

1. A lens drive mechanism comprising:
   a fixed cylindrical support, said cylindrical support having stator windings disposed on an outer peripheral surface thereof and a helicoid gear on an inner peripheral surface thereof;
   a lens holder having inner and outer cylinder members defining an annular spacing therebetween, said lens holder operatively receiving said cylindrical support so as to rotate with respect to said cylindrical support, said inner cylinder member being formed with a helicoid gear meshing with said helicoid gear of said cylindrical support;
   a ring shaped rotor magnet being disposed on said lens holder and supported on the inner periphery of said outer cylinder member of said lens holder in a manner to juxtapose an outer surface of the stator windings.

2. A lens drive mechanism as claimed in claim 1 wherein operative connection between said cylindrical support and said lens holder is established by said helicoid gears.

3. A lens drive mechanism as claimed in claim 2 wherein said stator windings comprise a pair of ring shaped windings arranged in the axial direction of said cylindrical support.

4. A lens drive mechanism as claimed in claim 1 wherein said lens holder comprises first and second concentrically arranged cylindrical portions between which said stator windings are located.

5. A lens drive mechanism as claimed in claim 4 wherein said first cylindrical portion is disposed radially outward of said second cylindrical portion and wherein said helicoid gears are formed respectively on an outer surface of said second cylindrical portion and on the inner surface of the cylindrical support and wherein said ring shaped magnet is disposed on an inner surface of said first cylindrical portion.

6. A lens drive mechanism as claimed in claim 1, wherein said cylindrical support supports a zoom lens drive assembly.

7. A lens drive mechanism comprising:
   a movable front tube member coaxially cooperating with a fixed rear tube member having only one forwardly-extending tubular extension;
   a plural pole yoke arrangement including a plurality of axially arranged coils disposed on an outer periphery of said tubular extension of said fixed rear tube member; p1 first gear means on an inner periphery of said tubular extension of said fixed rear tube member cooperating with a second gear means on an outer periphery of an inner axially-extending portion of said movable front tube member;
   a lens maintained on said front tube member and movable therewith; and
   a rotor magnet maintained on an inner periphery of an outer axially-extending portion of said movable tube member in juxtaposition with said yoke arrangement;
   whereby a single clearance between the inner periphery of the rotor magnet and the outer periphery of the yoke arrangement permits the diameter of the drive mechanism to be reduced.

8. The mechanism of claim 7 wherein said tube members are cylindrical members.

9. The mechanism of claim 7, wherein said first gear means and said second gear means are helicoid gears.

* * * * *